United States Patent [19]

Priolo et al.

[11] Patent Number: 5,346,351
[45] Date of Patent: Sep. 13, 1994

[54] POSTAL ROBOT

[75] Inventors: Vincenzo Priolo; Giorgio Repetto, both of Genova, Italy

[73] Assignee: Elsag Bailey, S.p.A., Italy

[21] Appl. No.: 7,725

[22] Filed: Jan. 22, 1993

[30] Foreign Application Priority Data

Jan. 22, 1992 [IT] Italy .................. TO92A 000042

[51] Int. Cl.⁵ ................................. B65G 1/04
[52] U.S. Cl. ...................... 414/277; 209/584; 209/900; 294/104; 414/282
[58] Field of Search ............ 414/277, 618, 280–282, 414/753, 609, 268, 269; 209/584, 900; 901/6, 7, 31, 38; 294/104

[56] References Cited

U.S. PATENT DOCUMENTS

| | | | |
|---|---|---|---|
| 956,756 | 5/1910 | Brigance | 414/280 X |
| 3,262,563 | 7/1966 | Hainer | 901/31 X |
| 3,885,678 | 5/1975 | Borg et al. | 414/618 |
| 4,149,278 | 4/1979 | Wiker et al. | 941/39 X |
| 4,641,753 | 2/1987 | Tamada | 209/584 X |
| 4,674,948 | 6/1987 | Hornacek | 414/269 X |
| 4,846,619 | 7/1989 | Crabtree et al. | 414/280 X |
| 4,848,592 | 7/1989 | Shemeta | 901/40 X |
| 4,984,108 | 1/1991 | Grant et al. | 414/280 X |
| 5,033,785 | 7/1991 | Woolley, Jr. | 294/104 |
| 5,174,454 | 12/1992 | Parkander | 414/282 X |
| 5,178,506 | 1/1993 | Meschi | 414/281 X |
| 5,236,296 | 8/1993 | Ostwald | 414/280 |

FOREIGN PATENT DOCUMENTS

| | | |
|---|---|---|
| 3936555 | 5/1991 | Fed. Rep. of Germany . |
| 2579188 | 9/1986 | France . |
| 262702 | 12/1985 | Japan ................ 414/280 |

*Primary Examiner*—David A. Bucci
*Attorney, Agent, or Firm*—Palmatier, Sjoquist & Helget

[57] ABSTRACT

A robot for emptying a postal machine having a plurality of containers into which the postal items (letters and cards) are delivered and form a substantially ordered stack of items, one on top of another. The robot includes a base structure located on a rectilinear structure arranged parallel to a wall of the postal machine and a columnar structure which is fixed to the base structure and supports a slide slidable vertically on the columnar structure itself. The slide supports a pair of arms which are slidable relative to the slide and have gripper devices at their ends arranged to be introduced into one of the containers to grasp a stack of postal items, to withdraw them from the container and to deposit them on a conveyor belt.

17 Claims, 5 Drawing Sheets

POSTAL ROBOT

BACKGROUND OF THE INVENTION

The present invention relates to a postal robot and in particular to a robot adapted to empty a post sorting machine automatically.

Postal machines are known which have a plurality of containers (boxes) which are arranged to contain postal items (letters and cards) delivered into each container by an input system coupled to the container itself and which receives the postal items from a sorting device.

These postal items are arranged on top of each other parallel to a base wall of the container and form a stack of letters and cards.

In known postal machines, the emptying of the containers is effected manually by an operator who removes the stack of items when it has reached a predetermined height, for example, slightly less then the height of the container.

SUMMARY OF THE INVENTION

The object of the present invention is to provide a postal robot which enables the emptying of the containers to be carried out completely automatically in a predetermined programme without the intervention of an operator.

The preceding object is achieved by the present invention in that it relates to a postal robot for emptying a postal machine having a plurality of containers for containing postal items, characterised in that it includes take-up means for taking up the postal items and drive means for operating the take-up means automatically.

BRIEF DESCRIPTION OF THE DRAWINGS

The invention will now be described with particular reference to the appended drawings which show a preferred, non-limitative, embodiment of the invention in which.

DETAILED DESCRIPTION OF THE INVENTION

Figure 1:
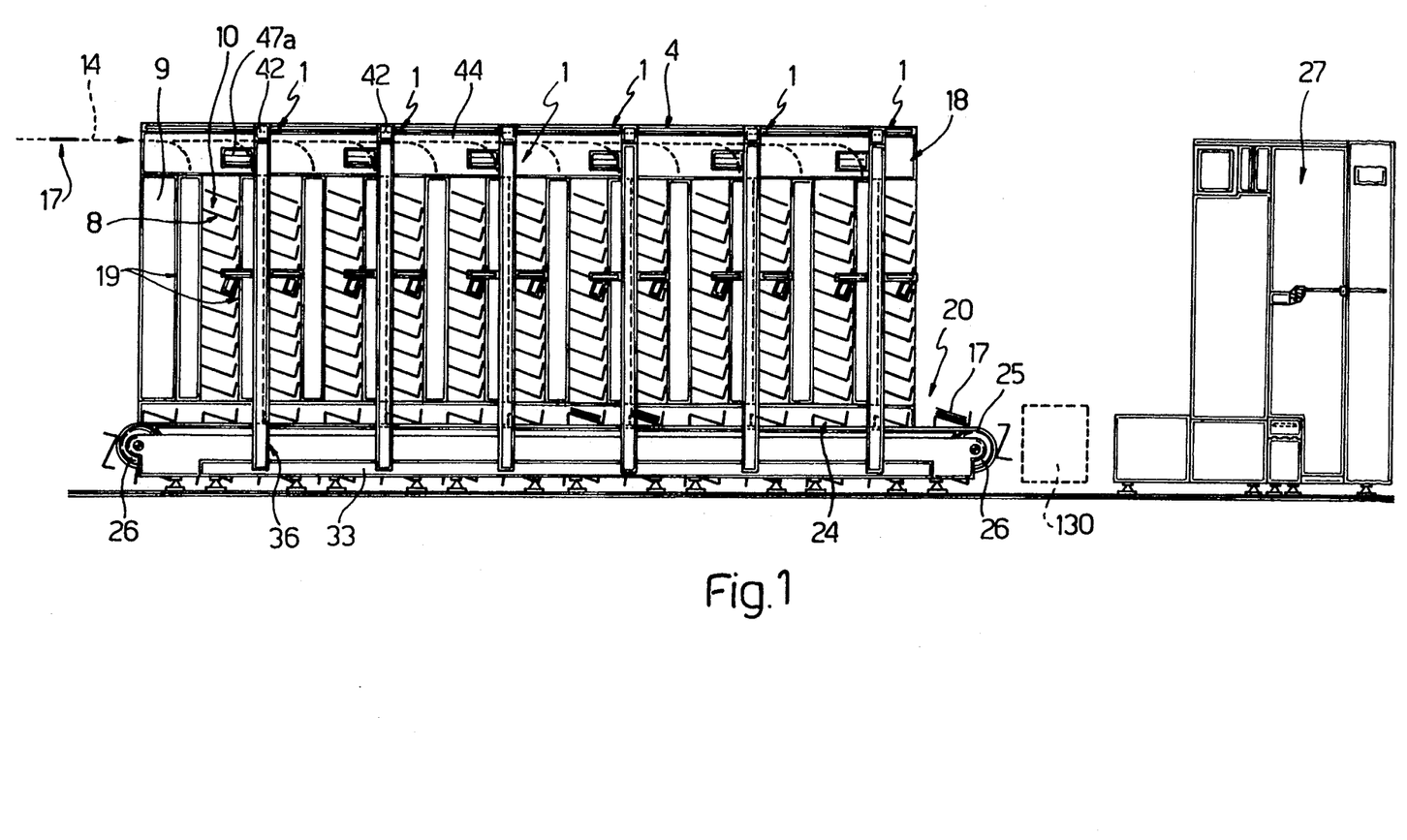
FIG. 1 is a side view of a postal machine having a plurality of postal robots formed in accordance with the scope of the present invention.

In FIG. 1, a postal robot is generally indicated 1 and is coupled with a postal machine 4 provided with a plurality of containers 8 (boxes) which are arranged one above another in twelve columns side by side, against a front wall 9 of the machine 4, each having a front aperture 10 for the removal of the items deposited in the respective container 8.

More particularly, the postal machine 4 has six postal robots 1 which are equispaced and arranged facing the front wall 9 so that each robot 1 can empty two adjacent columns. Since all the robots 1 have the identical mechanical structure and operate identically, only one postal robot 1 will be described below for simplicity.

The input of the postal machine 4 is connected to another postal machine (for example, a device for recognising the address and marking with the corresponding bar code) which sends an ordered flow 14 of postal items 17 (letters and cards) to the postal machine 4.

The postal machine 4 has reading and selecting devices (of known type, not shown) in an upper zone 18 and in input columns 19 for the containers 8 which sort the flow 14 and direct the items 17 into the containers 8 on the basis of a code (for example a bar code) printed on the postal object 17 itself.

Thus, each container 8 may contain letters and cards having the same starting postal code (corresponding to a particular bar code).

The output of the postal machine 4 is coupled to a conveyor 20 which is arranged parallel to the front wall of the machine 4 in the region below the latter and is provided with a plurality of conveyor baskets 24 arranged on a conveyor belt 25 which passes around two pulleys 26 arranged at the ends of the conveyor 20 and driven by electric motors (not shown).

The machine 4 is also coupled to an electronic unit 27 which controls the operation of the robots 1, the machine 4 and the conveyor 20.

Figure 2:
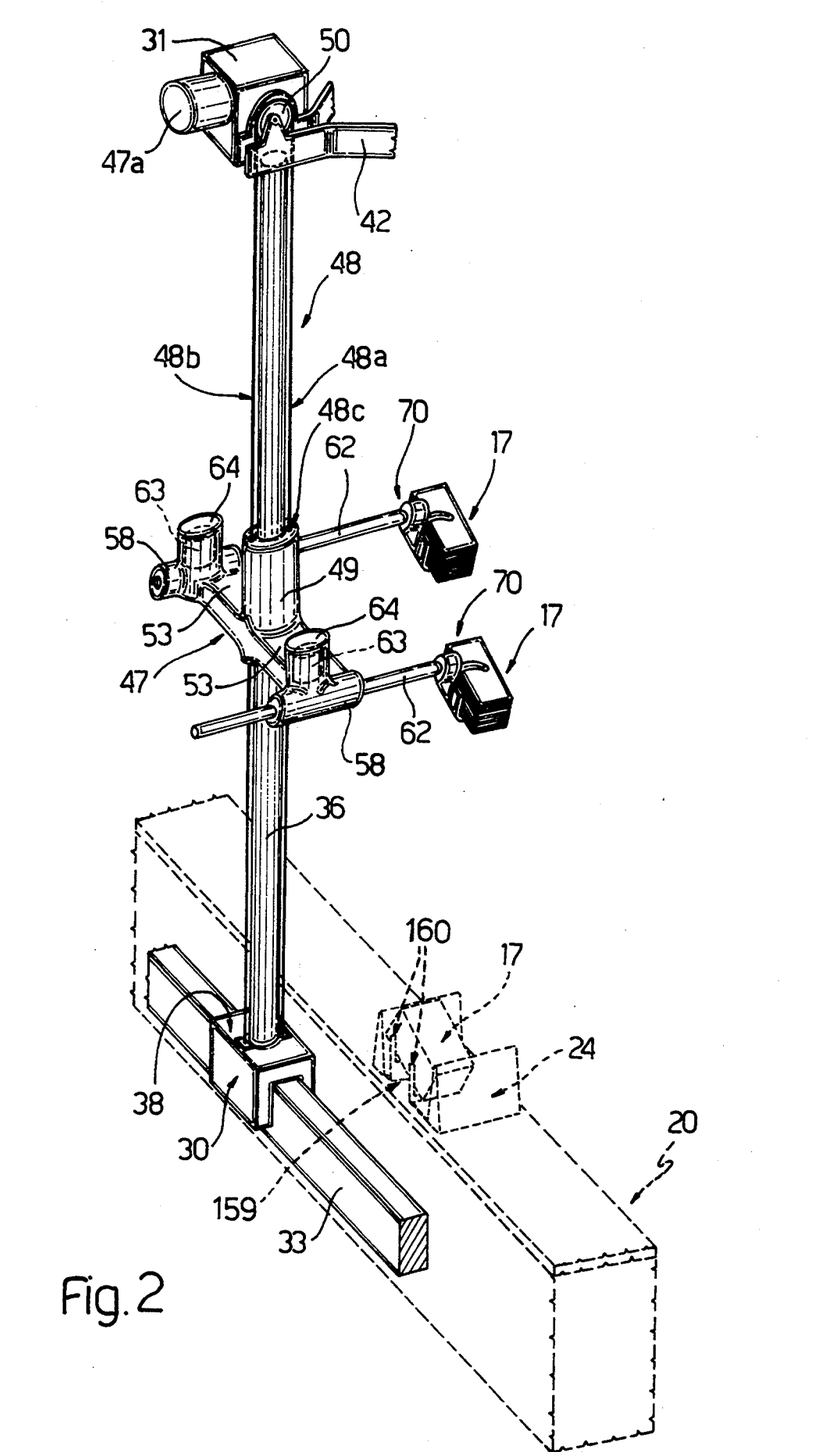
FIG. 2 is a perspective view of a particular embodiment of the robot of FIG. 1 on an enlarged scale.

With particular reference to FIGS. 1 and 2, the robot 1 includes a base structure 30 which is arranged on a rectilinear structure 33 located parallel to the conveyor 20 and to the front wall 9 of the machine 4.

The robot 1 also includes a columnar structure 36 which extends from the top 38 of the base structure 30 substantially perpendicular to the structure 33.

The columnar structure 36 is parallel to the wall 9 of the machine 4 and has an upper end connected to a double flange 42 which extends from the structure 36 to a rectilinear horizontal structure 44 arranged on an upper part of the machine 4.

The columnar structure 36 is coupled to a slide 47 which slides vertically on the structure 36 under the action of an electric motor 47a cantilevered on a block 31 fixed to the upper end of the structure 36 and controlled by a suitable position control circuit of known type.

The motor 47a drives a belt 48 which extends from the base structure 30 to a drive pulley 50 located at the upper end of the columnar structure 36 and has two passes 48a and 48b parallel to the columnar structure 36. More particularly, in the first pass 48a, the belt 48 has a first end 48c firmly connected to an upper part of the slide 47 and a second end (not shown) connected to a lower part of the slide 47.

The slide 47 includes a central tubular part 49 which is slidable on the columnar structure 36 and is connected to two appendages 53 which project from the part 49 perpendicular to the part 49 itself. At its end, each appendage 53 carries a tubular body 58 which is disposed horizontally and perpendicular to the appendage 53 and contains a respective arm 62 coaxial with the body 58 and slidable within the body 58 itself. The tubular body 58 is also coupled to an electric motor 63 (indicated in broken outline) housed in a casing 64 perpendicular to the body 58. The motor 63 is connected by a conventional transmission (for example, a rack-and-pinion) to the arm 62 which is driven by the motor 63 itself to move longitudinally of the tubular body 58, controlled by a suitable position control circuit of known type.

Thus the arms 62 move in parallel directions perpendicular to the vertical direction of movement of the slide 47.

Each arm 62 has a pincer-like gripper device 70 at its end facing the postal machine 4 which is inclined like the base surfaces of the containers 8 (FIG. 1) and is adapted to enter the containers 8 to take up the postal items 17 in the manner which will be clarified below.

Figure 3:
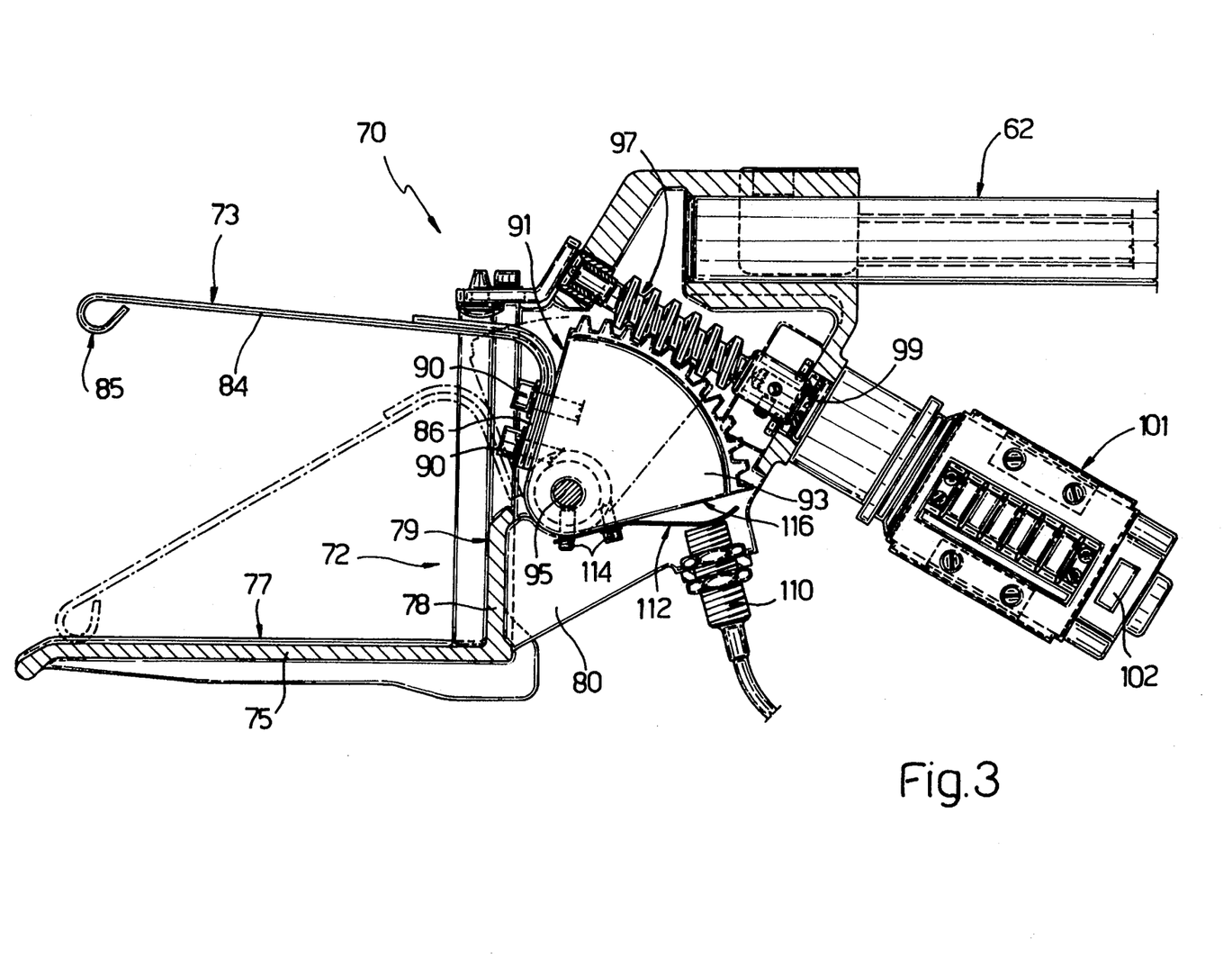
FIG. 3 is a longitudinal section of a detail of the robot of FIG. 2.
Figure 4:
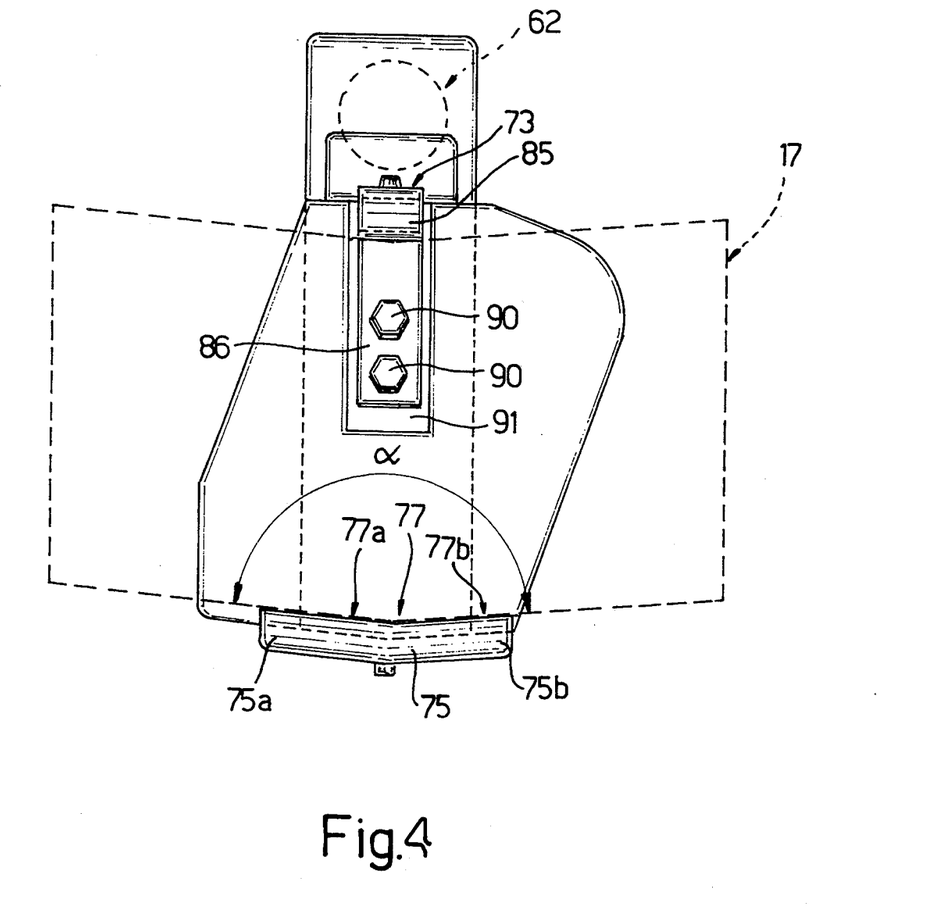
FIG. 4 is a front view of the detail of FIG. 3.

With particular reference to FIGS. 3 and 4, each gripper device 70 includes a support body 72 (adapted to constitute the support for the base of a stack of postal items 17) and a clamping element 73 which is pivotable relative to the body 72 and is arranged to press on an upper part of a stack of postal items 17, to grip them firmly. More particularly, the support body 72 is essentially L-shaped and includes a horizontal limb 75 the top of which is defined by a support plate 77 and a vertical limb 78 the side face of which is defined by a plate 79 perpendicular to the support plate 77.

The body 72 further includes a part 80 which extends perpendicularly from the plate 79 and is connected at its upper end to the arm 62.

The limb 75 (FIG. 4) includes two portions 75a and 75b fixed together with their upper parts defined by respective adjoining flat surfaces 77a and 77b at an angle α of about 170" to each other.

The clamping element 73 comprises a metal plate which is L-shaped in longitudinal section and is pivotable relative to the support body 72. More particularly, the metal plate 73 includes a first straight portion 84 which has a looped end portion 85 at its free end connected to a second portion 86 substantially perpendicular to the portion 84. The portion 86 is also firmly fixed by two screws 90 to a radial wall 91 of a gear sector 93 hinged to the body part 80 and pivotable about a pin 95. The sector 93 is also coupled to a worm screw 97 which is keyed to a shaft 99 of an electric motor 101 (for example a brushless electric motor) cantilevered on the portion 80.

The motor 101 is supplied by an electronic control circuit 102 which controls the torque generated by the motor 101 itself and ensures that this torque does not exceed a predetermined limit.

The drive from the motor 101 is transmitted through the gear coupling formed by the screw 97 and the sector 93 to the plate 73 which pivots about the pin 95.

More particularly, the plate 73 is movable between a first, closed position (indicated in FIG. 3 in chain line), in which the bent portion 85 is in contact with the support plate 77 and a second, open position in which the portion 84 is substantially parallel to the support plate 77.

The gripper device 70 is also provided with a position sensor of the on-off type constituted by a microswitch 110, for example of inductive type, mounted on a lower portion of the part 80 and arranged to detect the angular position of the plate 73. A resilient leaf 112 is connected by screws 114 to a radial wall 116 of the sector 93 and operates the microswitch 110 which is in its closed condition when the plate 73 is in the said open position.

The switch 110 is arranged to detect the condition in which the gripper device 70 is completely open, that is, when it is located with the portion 84 parallel to the support plate 77.

In use, the postal items 17 coming from the sorting machine upstream (not shown) reach the machine 4 and are directed by respective input devices 149 into the various containers 8 (one of which is illustrate in detail in FIG. 5) in which they form substantially ordered stacks of items 17.

Figure 5:
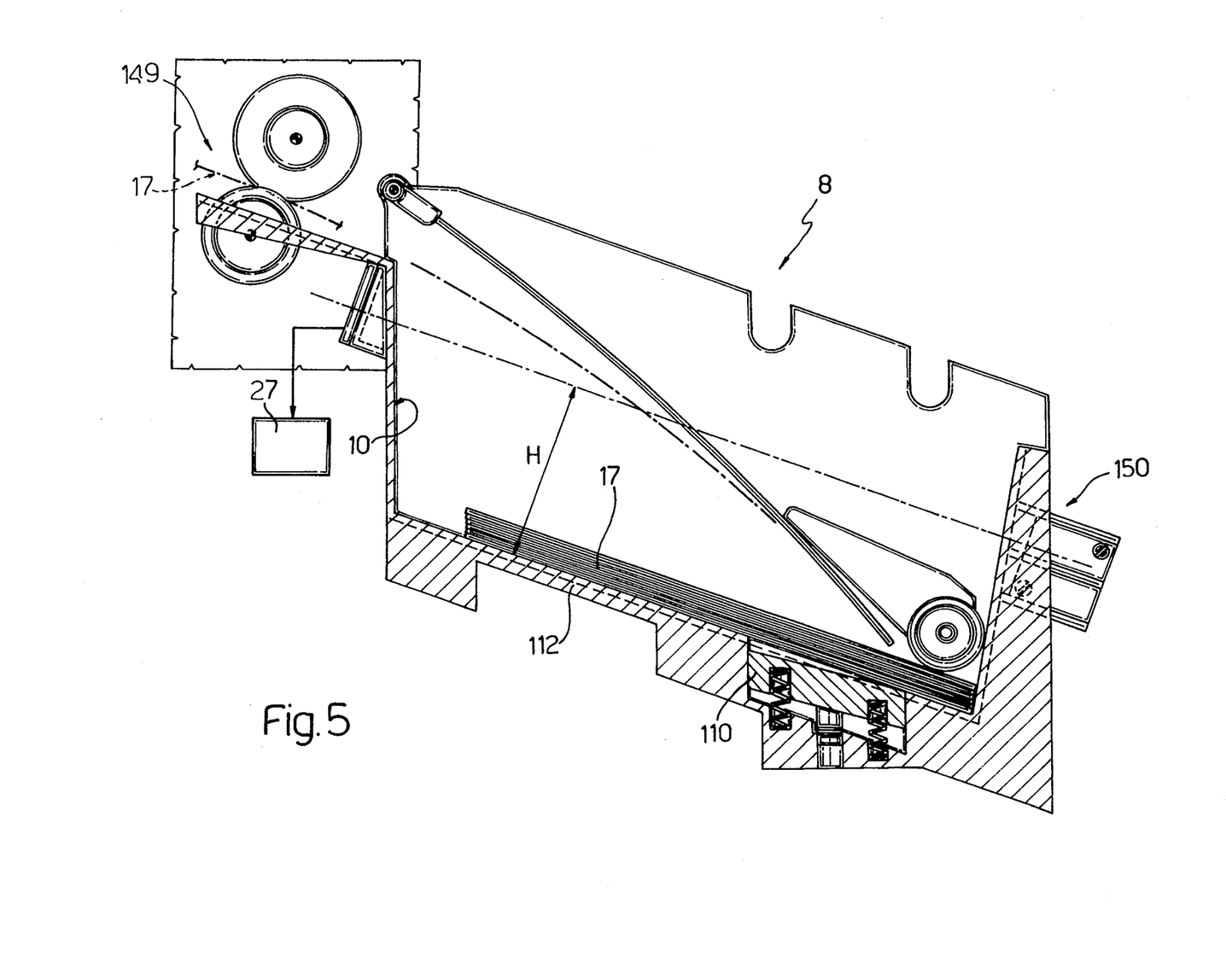
FIG. 5 is an enlarged side view, in section, of a detail (container) of the postal machine of FIG. 1.

When the height of the stack of items 17 exceeds a limit H (detected by a sensor 150 mounted in the container 8 and connected to the unit 27) this unit 27 actuates the automatic emptying of the container 8 whereby the slide 47 slides along the columnar structure 36 until it is located substantially at the same height as the container 8; in this position one of the two gripper devices 70 faces the container 8 to be emptied.

Subsequently the arm 62 is moved towards the front opening 10 of the container 8 and the support body 72 advances to cause the downward movement of a movable portion 110 of a flat base wall 112 of the container 8. Thus the support plate 77 becomes located substantially at the same level as the base wall 112 of the container 8 and the stack of items 17 rests on the plate 77; in this phase the gripper device 70 remains open with the portion 84 substantially parallel to the support plate Subsequently the electric motor 101 is activated and the plate 73 pivots towards the limb 75, pressing on the upper part of the stack of items 17 and gripping them firmly. The value of the torque applied by the plate 73 to the stack of items 17 is also limited by the control circuit 102 so as to prevent excessive squashing of the stack of items and to ensure that a closure load is applied to the stack of items whatever variation there is in the thickness of the stack itself.

The stack of postal items 17 moreover is not of uniform height because of non-uniformities in the dimensions of the postal items 17 themselves which have two points of greater thickness, that is, in the region of the stamp and in the central zone of a letter. The resultant sum of the points of greater thickness for the postal items 17 causes the presence of two raised zones in the stack of postal items 17 which define a depression into which the plate 73 is located.

The arm 62 is then moved away from the container 8 and the stack of items 17 is withdrawn from the container 8, after which the arm 62 is raised by several millimeters by means of the slide 47.

The stack of items 17 is subsequently transported by the robot 1 to the conveyor 20 so that the postal items 17, disposed in bundles, are deposited by the gripper device 70 in the baskets 24 which move parallel to the guide 33 towards a subsequent postal machine 130, (shown schematically), for example, a machine arranged to cover the bundles of items 17 with a transparent film.

The baskets 24, after being emptied, reach the end pulley 26, rotate about this and reverse their direction of movement; thus the baskets 24, after being emptied, move away from the machine 130 upside down.

In particular, in this emptying phase, the slide 49 is moved downwards so that at least one gripper device 70 is located inside a basket 24 which in the meantime has been stopped temporarily by the electronic unit 27 and has a lower inclined surface like the support plate 77 of the gripper device 70 and a lower aperture 159 for the passage of the gripper device 70 itself. Subsequently the gripper device 70 is opened by means of the motor 101 and is moved horizontally away from the basket 24 causing the postal items 17 to be released into the basket 24 itself where they are also retained horizontally by outer, upwardly-bent appendages 160 of the basket 24 itself.

From the above it will be clear that the postal robot of the present invention solves the disadvantages described of known postal machines, enabling the emptying of the containers 8 to be carried out fully automatically without any manual intervention.

The gripper devices 70 of the postal robot 1, because of the control effected by the circuit 102 which limits the torque, grip the stacks of items 17 without squashing them and without changing the arrangement of the postal items 17 themselves.

The presence of the two portions 75a and 75b at an angle α of about 170° to each other causes the stack of postal items 17 to bend slightly and prevents any of the postal items 17 from slipping out of the stack.

The clamping element 73 also exerts its pressure on the postal items 17 in the zone between the two said raised zones ensuring that the stack of postal items 17 is gripped firmly.

Finally, it will be clear that modifications and variations may be made to the present invention without thereby departing from the protective scope of the invention itself.

The postal machine 4 could, for example, also be provided with a single postal robot 1 movable relative to the various columns of the machine 4.

This robot 1 could for example slide along a rectilinear structure 33 (acting as a guide) under the action of an electric motor with a suitable position control circuit of known type, to locate it in front of the column in which there is a container which is to be emptied.

In this case the end of the flange 42 could be slidingly coupled with a straight horizontal guide located on the upper part of the machine 4. In this manner, the operations carried out in parallel by the various robots would be carried out in sequence by a single robot 1; this variant has the advantage of simplifying of the postal robot-machine complex but reduces the speed of sorting and makes it necessary to introduce an electronic position control for the robot 1 for positioning it along the guide 33.

The postal machine 4 could also be coupled to a larger number of robots 1 (for example three robots 1) reciprocable along portions of the guide 33; thus each robot 1 could be entrusted with a portion of the machine (for example 4 columns) to be emptied.

The columnar structure 36 could also be doubled to include two tubular bodies disposed parallel to and supporting the slide 47 which could have a single appendage 53 and a single gripper device 70.

The gripper device 70 could have a different drive system from that shown, including for example a pneumatic actuator. Finally the guide 33 could have a curved profile.

The vertical movement of the slide 47 could also be achieved by a counterweight connected to the belt 48 so as to reduce the force for driving the belt 48 itself.

We claim:

1. A postal robot for emptying a postal machine having a plurality of containers for containing postal items, the robot comprising:
   (a) take-up means for taking up the postal items the take-up means comprising a support body having a substantially L-shaped cross section including a vertical portion and a horizontal portion substantially perpendicular to said vertical portion and defining a support surface having respective adjoining flat surfaces which are angularly offset with respect to each other by an obtuse angle;
   (b) an automatic drive means for moving the take-up means;
   (c) a clamping element pivotable relative to the support body; and
   (d) a first drive means for moving the clamping element relative to the support body.

2. A robot according to claim 1, wherein said postal machine further comprises a perimeter, said automatic drive means comprising:
   (a) a base structure arranged on a guide structure disposed substantially parallel to at least a part of the perimeter;
   (b) a substantially vertical structure fixed to the base structure;
   (c) a slide slidable along the vertical structure; and
   (d) a second drive means for sliding said slide along said vertical structure, and said take-up means further comprising at least one pincher take-up device supported by said slide, said pincher take-up device being adapted to grip said postal items.

3. A robot according to claim 2, wherein said vertical structure includes at least one columnar body affixed to said base structure.

4. A robot according to claim 2, said slide comprising:
   (a) at least one part slidable on said vertical structure; and
   (b) at least one appendage projecting from said part and being substantially perpendicular to said part wherein said appendage supports said pincer take-up device.

5. A robot according to claim 4, said slide further comprising:
   (a) an arm having opposite ends slidably engaged to said appendage where said pincer take-up device is attached to one of said ends of said arm; and
   (b) a third drive means for sliding said arm relative to said appendage.

6. A robot according to claim 5, said appendage comprising an end portion, said arm being slidably mounted to said end portion.

7. A robot according to claim 2, wherein said slide moves along a straight vertical path which is substantially perpendicular to said guide structure.

8. A robot according to claim 7, wherein said pincer take-up device is movable along a straight horizontal path which is perpendicular to said straight vertical path.

9. A robot according to claim 1, wherein said clamping element is substantially L-shaped having a straight portion having an end portion for pressing said postal items.

10. A robot according to claim 2, said first drive means comprising:
    (a) a gear sector having a radial wall pivotally attached to said support body where said clamping element is connected to said radial wall; and
    (b) a worm screw coupled to said gear sector.

11. A robot according to claim 10, said first drive means further comprising a motor mounted upon said support body, said motor having an output shaft affixed to said worm screw.

12. A robot according to claim 1, said take-up means comprising a control means for regulating said first drive means for controlling an output level of torque provided by said first drive means.

13. A robot according to claim 10, said take-up means comprising a detecting means for detecting an angular position of said clamping element relative to said support body.

14. A robot according to claim 13, wherein said detecting means has at least one switch mounted on the support body.

15. A robot according to claim 14, further comprising a resilient part affixed to said radial wall of said gear sector wherein said switch is actuated by said resilient part.

16. A robot according to claim 1, further comprising an electronic control means for controlling said automatic drive means and said take-up means.

17. A postal robot for emptying a postal machine having a plurality of containers for containing postal items, the robot comprising:
(a) a take-up means for taking up the postal items, the take-up means comprising a support body having a substantially L-shaped cross section including a vertical portion and a horizontal portion substantially perpendicular to said vertical portion and defining a support surface;
(b) an automatic drive means for moving the take-up means;
(c) a clamping element pivotable relative to the support body;
(d) a first drive means for moving the clamping element relative to the support body, said first drive means comprising a radial wall having a gear sector and a resilient part; and
(e) a detecting means connected to said take-up means said detecting means for detecting an angular position of said clamping element relative to said support body, said detecting means having at least one switch mounted on said support body whereby said switch is activated by said resilient part during the change of relative positions between said radial wall and said support body.

* * * * *

UNITED STATES PATENT AND TRADEMARK OFFICE
CERTIFICATE OF CORRECTION

PATENT NO. : 5,346,351

DATED : September 13, 1994

INVENTOR(S) : Vincenzo Priolo; Giorgio Repetto

It is certified that error appears in the above-identified patent and that said Letters Patent is hereby corrected as shown below:

Column 4, line 17, after "plate", please add --77--.

Column 5, Claim 1, line 59, after "(a)", please insert --a--.

Signed and Sealed this

Twenty-fifth Day of April, 1995

Attest:

BRUCE LEHMAN

Attesting Officer    Commissioner of Patents and Trademarks